Feb. 11, 1964 G. V. MORRIS Re. 25,521

SECRECY COMMUNICATION RECEIVER

Original Filed June 29, 1959 3 Sheets-Sheet 1

INVENTOR
George V. Morris
BY James E. Tracy
ATTORNEY

SECRECY COMMUNICATION RECEIVER

Original Filed June 29, 1959 3 Sheets-Sheet 2

INVENTOR
George V. Morris
BY James E. Tracy
ATTORNEY

SECRECY COMMUNICATION RECEIVER

Original Filed June 29, 1959 3 Sheets-Sheet 3

INVENTOR
George V. Morris
BY James E. Tracy
ATTORNEY

United States Patent Office

Re. 25,521
Reissued Feb. 11, 1964

25,521
SECRECY COMMUNICATION RECEIVER

George V. Morris, Norridge, Ill., assignor to Zenith Radio Corporation, a corporation of Delaware Original No. 2,957,939, dated Oct. 25, 1960, Ser. No. 823,401, June 29, 1959. Application for reissue Jan. 31, 1962, Ser. No. 172,373
16 Claims. (Cl. 178—5.1)

Figure 1:
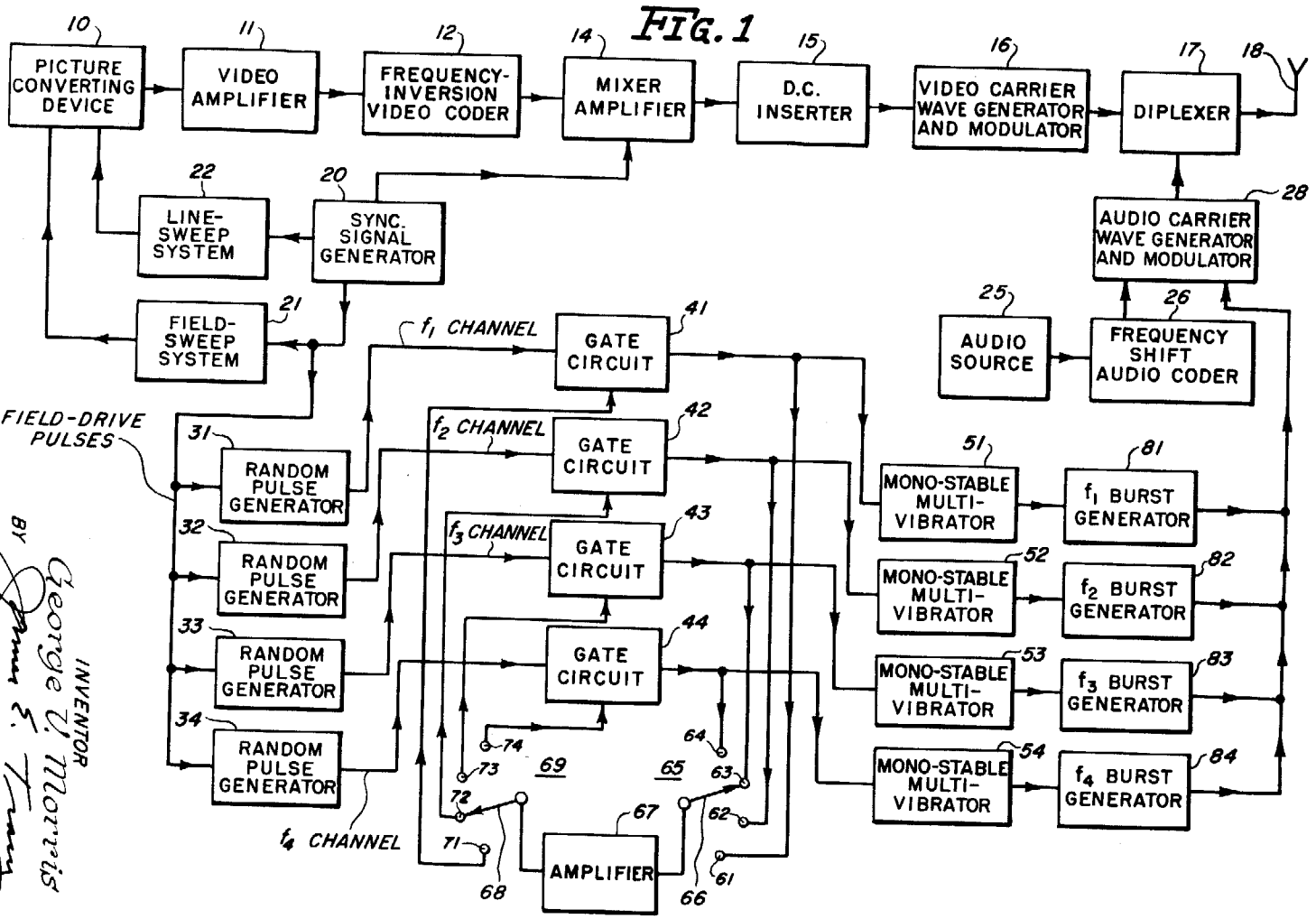

Matter enclosed in heavy brackets [ ] appears in the original patent but forms no part of this reissue specification; matter printed in italics indicates the additions made by reissue.

This invention relates to a secrecy communication receiver of the type including an adjustable decoding mechanism which must be adjusted in a particular prescribed manner before decoding or unscrambling is facilitated. More particularly, the invention pertains to a secrecy communication receiver wherein a correlation is made between the adjustment of the decoding mechanism and a given code pattern according to which it should be adjusted to achieve decoding. The term "correlation" is employed in the sense of a measure of the correctness of the adjustment of the decoding mechanism in the receiver. The arrangement of the present invention is particularly attractive when incorporated in a subscription television system and thus will be described in such an environment.

For any large scale subscription television service it is economically expedient to provide each of the subscribers with a decoding mechanism having a number of multi-position, code-determining or signal-translating elements that are adjusted relative to one another in accordance with a code pattern, preferably before the commencement of each program. The particular setting or adjustment of the elements, namely the code pattern, for each program is made known to those subscribers wishing to subscribe thereto and a charge assessment is made on the basis of such information conveyed. Systems of this general type are disclosed and claimed in, for example, Patents 2,843,656, issued July 15, 1958; 2,823,252, issued February 11, 1958; 2,816,156, issued December 10, 1957; and 2,852,598, issued September 16, 1958, all of which are assigned to the present assignee.

In such previous systems, the collective or overall code pattern of the various code-determining elements employed at each receiver determines at least in part the operation of the decoding function. If all of the elements are adjusted properly, namely the adjustment is correctly correlated with a specified, required code pattern, decoding is achieved. On the other hand, if the code-determining elements are all incorrectly positioned, a completely scrambled and distorted picture results. It will be appreciated that where a decoding mechanism includes a number of adjustable elements which must be properly set to achieve decoding, there is at least a temptation for an unauthorized person, not apprised of the requiring setting for a particular program, to employ a trial and error method of manipulating the code-determining elements in an attempt to reach the correct setting. Of course, if this effort should be successful, an unauthorized subscriber would succeed in avoiding the obligation to make a payment for enjoying a subscription television program. Trial and error adjustment of the decoder is a difficult task but it is suspected that in occasional and rare instances the burden may possibly be eased through the observation of changes occasioned in the reproduced image as the trial and error process is pursued step-by-step. As each one of the signal-translating elements is correctly positioned, it may be possible for the unauthorized person to detect and guide the approach to the correct overall setting or required code pattern through the observation and evaluation of subtle visual clues in the form of progressive minor improvements in certain critical details of image reproduction.

Should any help be derived from observation of the image, cheating may be made more difficult by arranging that the image shall not appear on the screen unless and until the decoding mechanism has been conditioned as required to effect complete picture decoding. It will be appreciated that it is also advantageous to insure that decoding of the audio portion of the telecast does not occur until the decoding mechanism is properly adjusted.

In copending patent application Serial No. 823,463, filed concurrently herewith, *and issued November 28, 1961, as Patent 3,011,016, in the name of Erwin M.* Roschke, and assigned to the present assignee, various arrangements are disclosed and claimed for achieving such objectives. As also explained in that application, practicing of such a concept of completely preventing the operation of a video decoder and/or audio decoder permits the use of relatively elementary type coding and decoding apparatus.

The present invention is generally directed to the same objectives as that to which the concurrently filed Roschke application is addressed except they are achieved with a completely different arrangement.

Accordingly, it is an object of the present invention to provided an improved secrecy communication receiver.

It is an additional object to provide an improved secrecy communication system wherein unauthorized decoding is virtually eliminated.

It is another object of the invention to provide in a secrecy communication system novel apparatus for actuating a use meter in order that a subscriber is charged or billed only for program information actually unscrambled.

A secrecy communication receiver, constructed in accordance with one aspect of the invention, includes means for deriving an encoding signal having a characteristic representing a given code pattern. A decoding mechanism is coupled to the deriving means and includes a plurality of multi-position, signal-translating or code-determining elements to be adjusted relative to one another in accordance with the code pattern. There are an energy storage device and means including a charging circuit for establishing and maintaining a charge on the storage device. A normally interrupted discharge path is provided for the storage device. Means including the decoding mechanism utilizes at least a portion of the encoding signal to complete the discharge path during any operating interval in which there is an inexact correlation of the adjustment of the signal-translating elements relative to the code pattern. Finally, the secrecy communication receiver includes a signal reproducer and means responsive to the charge condition of the storage device for controlling the responsiveness of the reproducer.

Figure 2:
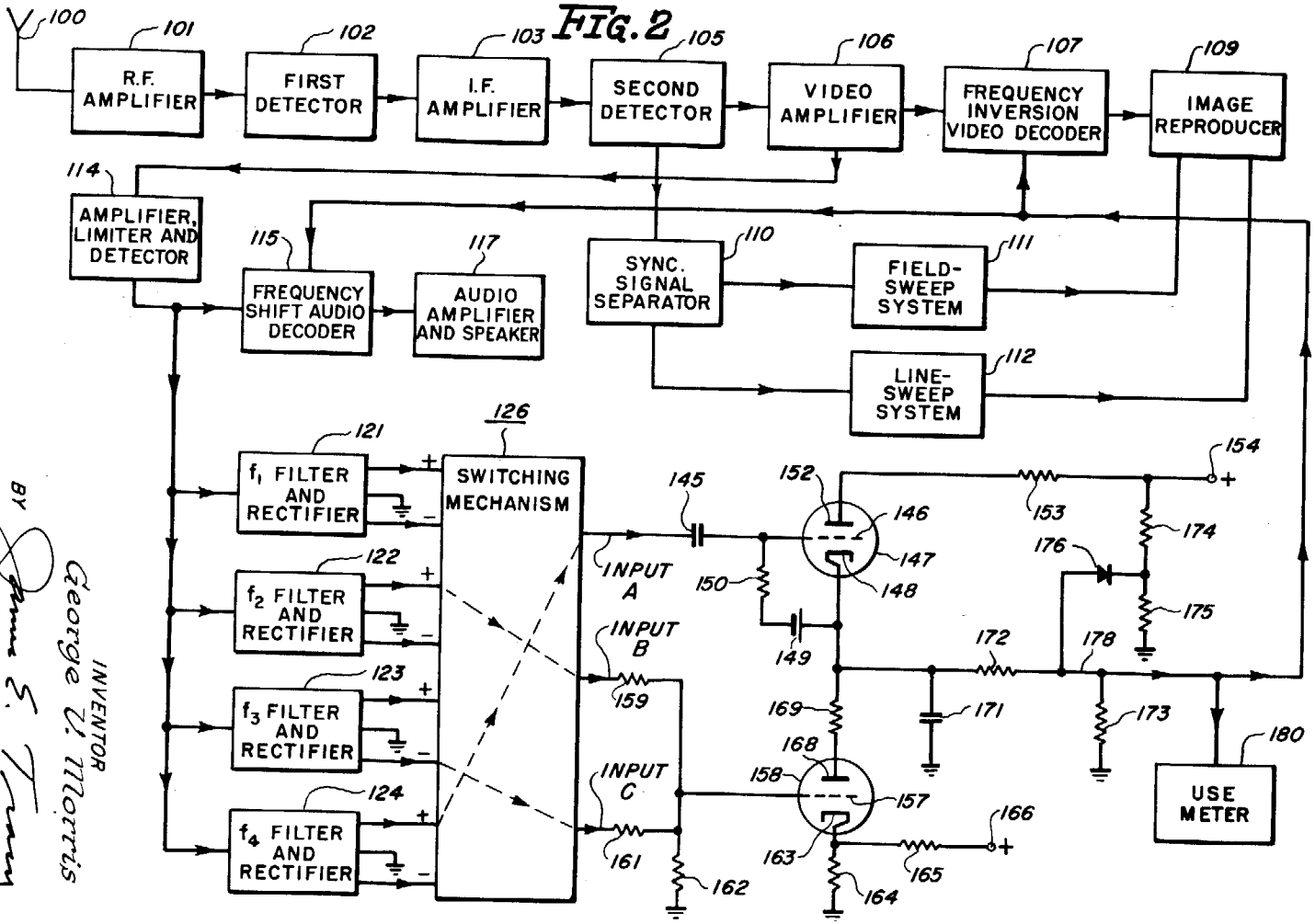
Figure 3:
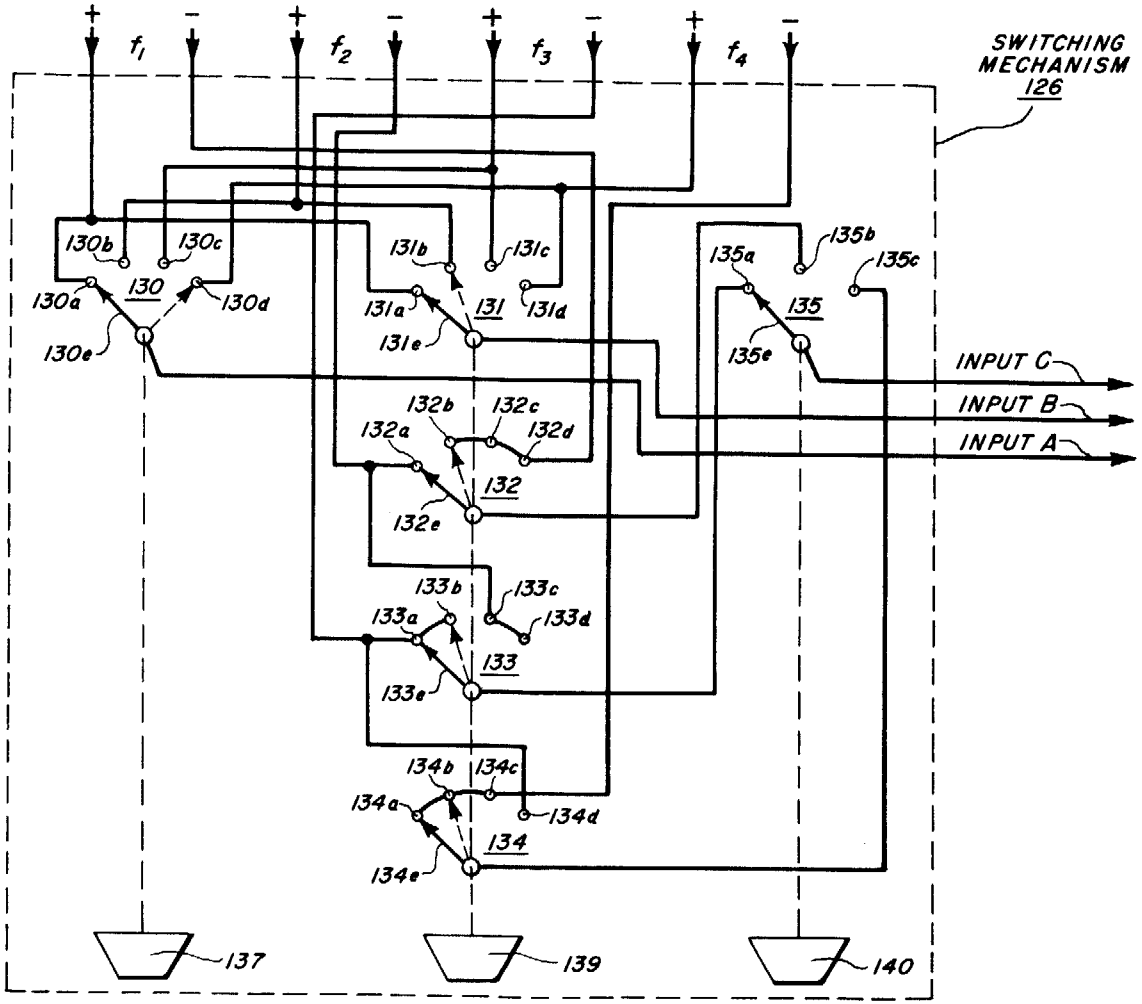

The features of this invention which are believed to be new are set forth with particularity in the appended claims. The invention, together with further objects and advantages thereof, may best be understood, however, by reference to the following description in conjunction with the accompanying drawings, in which:

FIGURE 1 is a block diagram representation of a secrecy communication transmitter, specifically a subscription television transmitter;

FIGURE 2 schematically illustrates a secrecy communication receiver, specifically a subscription television receiver, constructed in accordance with the invention and arranged to utilize the signal transmitted from the transmitter of FIGURE 1; and, FIGURE 3 shows a portion of the receiver of FIGURE 2 in more detailed form.

Turning now to the structural details of the transmitter of FIGURE 1, a picture converting or camera pickup device 10, which may be of any well known construction for developing a video signal representing an image to be televised, is coupled through a video amplifier 11 to a frequency-inversion video coder 12. This coder contains heterodyning circuitry which beats or heterodynes a part or all of the frequency components of an applied video signal to a higher portion of the spectrum and then suppresses the heterodyning signal and upper side band. Thus, the applied video signal is effectively inverted frequency-wise in coder 12 so that the normally high frequency video components representing fine or sharp picture detail are represented by low frequency information in the output of coder 12, and conversely, the ordinarily low frequency information conveying the coarse picture detail information is represented by high frequency video signals. The portion of the frequency spectrum occupied by the inverted video signal may or may not be the same as that occupied by the original video signal depending on the frequency of the heterodyning signal.

Such frequency inversion constitutes an adequate scrambling or coding function since it effectively codes a characteristic of the television signal inasmuch as a normal television receiver would not contain suitable compensating circuitry for re-inverting the signal components. Consequently, the picture display in a conventional receiver, due to the coding introduced by video coder 12, would be thoroughly and completely scrambled. A coder of this type is described in detail in Patent 2,847,500, issued August 12, 1958, in the name of Walter S. Druz et al., and assigned to the same assignee as the present invention.

The output of vide coder 12 is coupled to one input of a mixer amplifier 14 which is coupled through a direct current inserter 15 to a video carrier wave generator and modulator 16 which, in turn, is coupled through a diplexer 17 to a transmitter antenna 18. The transmitter also includes a conventional synchronizing signal generator 20 which supplies the usual field- and line-synchronizing and associated pedestal components to mixer amplifier 14 as shown by the connection between those two units. Generator 20 additionally supplies field- and line-drive pulses to a field-sweep system 21 and to a line-sweep system 22, respectively, which are connected to associated deflection elements (not shown) of picture converting device 10.

The audio signal portion of the telecast is provided by audio source 25 which may constitute a conventional microphone and an audio amplifier. The output of audio source 25 is coupled through a frequency shift audio coder 26 to one input of an audio carrier wave generator and modulator 28, the output circuit of which is connected to another input of diplexer 17. As in the case of video coder 12, audio coder 26 may be elementary in nature. Coder 26 like coder 12 may contain heterodyning apparatus in order to shift the audio information, with an inverted frequency distribution, to a different portion of the frequency spectrum where it does not normally reside. Preferably, the audio signal is shifted or moved to a higher portion of the frequency spectrum.

The video and audio coding functions operate continuously without any further control at the transmitter but in order to make certain that only those subscribers who have actually subscribed for a given program are able to enjoy or unscramble that program, it is necessary that an encoding signal be generated having a characteristic representing a particular code pattern. In this way, only the receivers of the subscribers who have in a sense been apprised of the code pattern, will be able to appreciate the subscription telecast.

To this end, the input circuit of each of four random pulse generators 31–34 is connected to the output of generator 20 from which field-drive pulses are derived. Each of generators 31–34 may be of identical construction and may take the form of that described and claimed in detail in Patent 2,588,413, issued March 11, 1952, in the name of Erwin M. Roschke, and assigned to the present assignee. As disclosed in the Roschke patent, each random pulse generator effectively translates field-drive pulses from its input to its output terminals except that certain ones of them, selected at random, are deleted or removed. In other words, each random pulse generator effects a random division of the field-drive pulses.

The output terminals of generators 31–34 are connected, respectively, through a series of gate circuits 41–44 to the input circuits of a series of mono-stable multivibrators 51–54. Each of the gate circuits is of the type which may be readily changed or converted from one which is normally open or normally-translating to a gate which is normally-closed or normally-blocked. Accordingly, each of gate circuits 41–44 is provided with simple switches (not shown) for controlling the normal translating condition thereof; they may be adjusted at will, usually before the commencement of each program. The reason for providing such flexibility of the gates will be appreciated later.

The outputs of gate circuits 41–44 are also connected to the stationary contacts 61–64, respectively, of a four-position rotary switch 65. The movable contact 66 of switch 65 is coupled through an amplifier 67 to the movable contact 68 of another four-position rotary switch 69. Stationary contacts 71–74 of switch 69 are connected, respectively, to additional inputs of gates 41–44. The manner in which switches 65 and 69 are positioned will be appreciated later. Suffice it to state at this point, however, that for any given subscription television program, three out of the four gate circuits 41–44 are made normally-open whereas the fourth is made normally-closed. The normally-closed gate will be that which is connected to movable contact 68. Amplifier 67 serves as a gating signal source in order to render the normally-closed gate circuit open or operative only during certain intervals.

The parameters of each of mono-stable multivibrators 51–54 are so selected that once it is actuated from its normal to its abnormal operating condition, it will remain there for approximately one full field-trace interval. The outputs of multivibrators 51–54 are coupled, respectively, to a series of code-signal burst generators 81–84 each of which produces a signal having a respective one of four different assigned frequencies designated $f_1$–$f_4$. Preferably, the burst generators are designed so that the frequencies $f_1$–$f_4$ fall in the super audible audio range. The outputs of burst generators 81–84 are connected in common and then to an input of audio carrier wave generator and modulator 28 in order to combine the $f_1$–$f_4$ code-signal bursts, which may also be considered as correlation components, with the scrambled audio information. Collectively the code-signal bursts or components may be designated an encoding signal.

Since, as well be learned, generators 31–34 and the circuitry coupled to generators 81–84, respectively, control the development of code bursts of frequencies $f_1$–$f_4$, respectively, it is convenient to refer to the four controlling circuits as the $f_1$–$f_4$ channels, respectively.

Since it is necessary or advisable to understand at least a portion of the operation of the subscription television receiver of FIGURE 2 in order to fully appreciate the manner in which the transmitter is operated, it is expedient to defer the operational description of the transmitter of FIGURE 1 until a more appropriate foundation has been laid by considering some of the structural aspects of the receiver. Accordingly, consideration will now be given to a structural description of the receiver of FIGURE 2.

There, an antenna 100 is connected to radio frequency amplifier 101 which is coupled in turn to a first detector 102 having its output connected to an intermediate frequency amplifier 103 consisting of one or more stages. Unit 103 is connected to a second detector 105, the output terminals of which are connected through a video amplifier 106 to a frequency inversion video decoder 107.

Decoder 107 may take a form similar to that of frequency-inversion video coder 12 at the transmiter in order to effectively heterodyne the already frequency inverted video signal and than suppress the heterodyning frequency component and the upper side band so that the net result is the developement of the original uncoded video signal with its various components exhibiting their original unaltered frequency location. Decoder 107 differs however, in one very important respect from coder 12 and that is it is normally disabled or blocked by, for example, a bias arrangement so that it is rendered operative to unscrambled or decode the scrambled video information only during intervals when an appropriate actuating or gating signal is applied thereto in a manner to be explained. The output of video decoder 107 is connected to the input electrodes of a cathode ray image reproducing device or picture tube 109.

Second detector 105 is also coupled to a customary synchronizing-signal separator 110 having output circuits connected to a field-sweep system 111 and to a line-sweep system 112 which are connected in turn to associated deflection elements (not shown) of picture tube 109.

Assuming that the illustrated receiver is of the intercarrier type, an intercarrier signal component is derived from video amplifier 106 and is supplied to a unit 114 consisting of a conventional amplifier, amplitude limiter, and discriminator detector. The output of unit 114 is coupled through a frequency shift audio decoder 115 to an audio amplifier and speaker combined for illustrative purposes in a single unit 117. Audio decoder 115 may be somewhat similar to audio coder 26 in the transmitter except that it is effectively operated in complementary fashion in order to shift or return the scrambled audio information from the portion of the spectrum which it occupies as transmitted back to the original, appropriate location as required to accomplish audio unscrambling. As in the case of decoder 107, however, audio decoder 115 is normally inoperative or disabled by a bias arrangement and is only turned on during certain operating intervals, as will be described.

The output of unit 114 is also coupled to the input circuits of a series of selectors or filter and rectifier units 121–124, each of which includes appropriate resonant circuits in order to be frequency selective to assigned, respective ones of code-signal frequencies $f_1$–$f_4$. Each of units 121–124 actually contains two rectifiers in order that both a positive and negative rectified envelope is developed from each code-signal burst. Thus, each of filter and rectifiers 121–124 has been illustrated with three output terminals, the center one of which is grounded, in order to show that both a positive rectified envelope and a negative rectified envelope are produced in response to each code burst. Accordingly, the output conductors from the two outside output terminals of each of units 121–124 are labeled (+) and (−), respectively.

The four pairs of (+) and (−) output conductors from the filters and rectifiers are coupled to the input terminals of a switching mechanism 126 which has three output terminals connected to inputs A, B and C. Switching mechanism 126 is provided to selectively connect or permute the eight inputs from units 121–124 to inputs A–C in accordance with any one of a multiplicity of permutation patterns.

In order to provide an adequate degree of security against unauthorized appropriation or parasiting of the telecast by trial and error adjustment of switching mechanism 126, it is preferable that the mechanism comply with or satisfy certain conditions or "ground rules." One form of switching mechanism 126 is shown in FIGURE 3. It, of course, satisfies or meets the preferred conditions.

Switching mechanism 126 as illustrated in FIGURE 3 includes five four-position signal-translating elements in the form of rotary switches 130, 131, 132, 133, and 134, and one three-position signal-translating or rotary switch 135. The position of movable contact 130e of switch 130 is manually controlled by the subscriber by means of a knob 137 as shown by the dashed construction line therebetween. Movable contacts 131e, 132e, 133e and 134e, of switches 131–134, respectively, are all concurrently or simultaneously adjusted by means of a single control knob 139 as shown by the dashed construction line running through those switches and to the knob. Three-position switch 135 is adjusted by a knob 140 as is schematically illustrated by a dashed construction line connecting that knob to movable contact 135e.

For convenience, the four pairs of (+) and (−) output conductors from filter and rectifier units 121–124 have been illustrated in FIGURE 3 by placing the appropriate label $f_1$, $f_2$, $f_3$ or $f_4$ between each pair. The (+) output from $f_1$ filter and rectifier 121 is connected to stationary contact 130a of switch 130 and also to stationary contact 131a of switch 131. The (−) output from unit 121 is connected to stationary contact 132d of switch 132, contacts 132b and 132c of that switch being joined together and then connected to contact 132d. The (+) output from unit 122 is connected to contact 130b of switch 130 and to stationary contact 131b of switch 131. The (−) output from $f_2$ filter and rectifier 122 is connected to stationary contact 132a of switch 132, and also to stationary contacts 133c and 133d of switch 133. The $f_3$ (+) output conductor from unit 123 is connected to both contacts 130c and 131c of switches 130, 131, respectively. The (−) output of unit 123 is connected to contacts 133a and 134d of switches 133, 134, respectively, contact 133b of switch 133 also being joined to contact 133a. The (+) output from $f_4$ filter and rectifier 124 is connected to contacts 130d and 131d of switches 130, 131, respectively. Finally, the $f_4$ (−) output from unit 124 is connected to each of contacts 134a, 134b and 134c.

Movable contact 130e is connected to input A, movable contact 131e is connected to input B, and movable contact 135e is connected to input C. Movable contact 132e is connected to stationary contact 135b of switch 135, movable contact 133e is connected to stationary contact 135a, and movable contact 134e of switch 134 is connected to stationary contact 135c of switch 135.

With the above described arrangement of switches, for every one of the multiplicity of available knob setting patterns of knobs 137–140 (there being a total of 48 different possible knob settings) there will always be at least one of the (+) conductors connected to input A, at least one of the (+) conductors connected to B (without the (−) conductor associated with the same frequency being connected to input C), and at least one (−) conductor connected to input C. The utility of satisfying such conditions will be appreciated later. The capability of fulfilling these conditions may very easily be demonstrated simply by tracing out a couple of adjustments of switching mechanism 126. The movable contacts of all of the switches are shown in their positions farthest to the left; this may be considered their "home" positions. Under such circumstances, the $f_1$ (+) conductor is connected to both inputs A and B, and the $f_3$ (−) conductor is connected to input C. It will be seen that the conditions have been met as there is a (+) conductor connected to each of inputs A and B without the (−) conductor of the frequency associated with input B being connected to input C. Moreover, there is a (−) conductor connected the input C.

By way of further demonstration, a typical setting or adjustment other than the home position of mechanism 126 may be considered. Assume that knob 137 has been adjusted to position movable contact 130e in engagement with contact 130d and that knob 139 has been adjusted to position the movable contacts that it controls into engagement with the associated b contacts, as shown by the alternate positions illustrated in dashed construction lines of the movable contacts of switches 130–134.

Assume further that knob 140 is left unaltered. For the assumed pattern of knobs 137–140, it will be noted that the $f_4$ (+) conductor is connected to input A and that the $f_2$ (+) conductor is connected to input B. Additionally, the $f_3$ (—) conductor is connected to input C. Once again, the conditions have been met or satisfied. Such a typical illustrative setting is schematically illustrated by dashed construction lines within block 126 in FIGURE 2.

Returning now to the consideration of the construction of the receiver of FIGURE 2 input A is coupled through a condenser 145 to the grid 146 of a triode 147. Cathode 148 of the triode is connected to grid 146 through the series arrangement of a source of unidirectional potential 149 and a resistor 150, the polarity of source 149 being such that grid 146 is normally negative with respect to cathode 148 in order that triode 147 may serve as an electronic switch which is normally non-conductive or cut-off. Plate 152 of triode 147 is connected through a load resistor 153 to a source 154 of positive unidirectional potential.

Input B is connected to the grid 157 of a triode 158 through a resistor 159. Input C is connected through the series arrangement of a pair of resistors 161, 162 to ground, the junction of the resistors being connected to grid 157. Cathode 163 of tube 158 is connected through one resistor 164 to ground and through another resistor 165 to a source of positive unidirectional potential 166. Source 166 is provided in order that triode 158 may also serve as a normally-cutoff electronic switch, the potential on cathode 163 normally being positive with respect to that on grid 157 with the result that the tube is normally biased to its cutoff or non-conductive condition.

Plate 168 of triode 158 is connected through a resistor 169 to cathode 148 of tube 147. An energy storage device in the form of a condenser 171 is connected between cathode 148 and ground and a pair of series-connected resistors 172, 173 is also connected between cathode 148 and ground. A pair of series-connected resistors 174, 175 is connected between source 154 and ground to provide a voltage dividing arrangement and the junction of those resistors is connected through a clamping diode 176 to the junction of resistors 172 and 173, which junction for convenience of explanation is labeled 178. Triode 147, resistor 153 and source 154 provide a charging circuit for energy storage device 171 and tube 158, and resistors 169 and 164 provide a discharge path for condenser 171.

Junction 178 is connected to a use meter 180 to control the actuation thereof and also to additional inputs of video decoder 107 and audio decoder 115 in order to control their operation. Specifically, unless the potential developed at junction 178, which is determined by the charge condition of storage device 171, is of the proper magnitude and polarity, decoders 107 and 115 remain in their normally inoperative positions and thus do not achieve unscrambling.

Returning now to the transmitter of FIGURE 1 to consider the operation thereof, picture converter 10 produces a video signal representing the image to be televised and this signal after being amplified in video amplifier 11 is translated through video coder 12 to mixer amplifier 14. Frequency inversion coder 12 continuously alters the frequency of the video components and effectively supplies the video information to mixer 14 in scrambled form by virtue of the fact that the video signals are inverted frequency-wise from their original distribution. Mixer 14 combines the scrambled video information with the customary periodically recurring field- and line-synchronizing and blanking pulses from synchronizing generator 20 to develop a composite coded video signal which is supplied to direct current inserter 15 wherein it is adjusted with respect to background level. The adjusted video signal is then amplitude modulated on a picture carrier in unit 16 and the modulated carrier is supplied through diplexer 17 to antenna 18 from which it is transmitted to subscriber receivers. Sweep systems 21 and 22 are synchronized by field- and line-drive pulses from generator 20 in conventional manner.

Audio source 25 picks up the sound information accompanying the telecast, amplifies and supplies it to audio coder 26 wherein the audio components are shifted in the spectrum to occupy abnormal positions to achieve sound scrambling. The coded audio signal is frequency modulated on the sound carrier in unit 28 and supplied through diplexer 17 to antenna 18 for concurrent radiation to the subscriber receivers with the video information.

The periodically recurring field-drive pulses from generator 20 are divided on a random basis in generators 31–34 so that effectively only randomly selected ones of the field-drive pulses reach the inputs of gates 41–44. As explained hereinebfore, each of the gates is manually controllable as to its normal translating condition and is adjusted preferably before each subscription television program so that three of them are normally-open whereas the fourth is of the normally-closed variety. The particular one of gates 41–44 which is selected to be normally-closed is determined by the particular adjustment that the subscriber must make to his switching mechanism 126 to successfully unscramble the telecast.

Specifically, the gate circuit which controls the burst generator that develops bursts destined for input B in the receiver is made normally-closed, for reasons which will be understood. Additionally, switch 6 is adjusted to connect movable contact 68 to the normally-closed gate circuit, namely to the gate circuit coupled to the burst generator providing pulses for input B. On the other hand, switch 65 is positioned so that movable contact 65 connects with the output of the gate circuit coupled to the burst generator developing bursts for input C. With the typical settings of switches 65 and 69 as shown in FIGURE 1, the output of gate 43 which is coupled to $f_3$ burst generator 83, is connected through stationary contact 63 and movable contact 66 to the input of amplifier 67. The output of the amplifier is coupled through movable contact 68 and stationary contact 72 to gate 42, which controls $f_2$ burst generator 82 through multivibrator 52. It will be noted that such a typical setting agrees with the illustrative settings in FIGURES 2 and 3. In other words, switch 65 is effectively connected to the $f_3$ channel and that is the frequency which is supplied to input C, and switch 69 is connected to the $f_2$ channel which is the frequency applied to input B.

The pulses developed at the output terminals of gate circuits 41–44 are employed to trigger the associated ones of multivibrators 51–54 which in turn control the operation of burst generators 81–85 in order that once a burst generator is turned on it will remain there for a full field. Thus, the duration of each of the code-signal bursts developed is equal to that of a field-trace. As mentioned previously, the bursts considered collectively may be through of as an encoding signal.

For the assumed case, because of the substantial independence of the different frequency channels it is possible that pulses may be developed in the outputs of either two or all three of gate circuits 41, 43 and 44 simultaneously and thus bursts of frequencies $f_1$ $f_3$ and $f_4$ or any pair of them may be generated concurrently. Consequently, the burst generating apparatus provides much leeway and flexibility. The $f_2$ bursts are, however, inhibited in a sense since a burst of $f_2$ frequency can only be produced if a burst of $f_3$ frequency is being generated concurrently.

This is facilitated by the fact that gate circuit 42 is normally closed and thus even though a pulse may be developed in the output of random pulse generator 32, it will not be translated through gate 42 to effect eventual operation of generator 82. However, if at the time a pulse is supplied from generator 32 to gate 42 a pulse is also being translated through gate 43 from generator 33, the latter pulse in addition to triggering multivibrator 53 also is supplied through switch 65, amplifier 67 and switch 69 to gate circuit 42 to gate or turn that circuit on. This permits the translation of a pulse to multivibrator 52.

Consequently, while the bursts destined for inputs A and C may occur by themselves or together, the code bursts destined for input B cannot occur alone but rather must be accompanied by bursts which are earmarked for input C. Once again, the utility of such scheduling or programming of the code-signal bursts is to be appreciated hereinafter.

The encoding signal containing the code-signal bursts from generators 81–85 is combined with the scrambled audio information and frequency modulated on the sound carrier in unit 28.

Turning now to an operational description of the receiver of FIGURE 2, the coded television signal is picked up by antenna 100, amplified in radio frequency amplifier 101 and demodulated or heterodyned to the selected intermediate frequency in detector 102. The intermediate frequency thereby developed is amplified in amplifier 103 and detected in second detector 105 to produce a coded composite video signal. This latter signal is amplified in video amplifier 106 and then applied to frequency inversion video decoder 107. As mentioned previously, this decoder is normally biased to be inoperative so that decoding does not take place. In fact, the bias arrangement may be such that decoder 107 produces no output signal whatsoever, in which case there would be no video information, scrambled or otherwise, supplied to image reproducer 109. Assuming that a proper control potential (namely it exceeds a predetermined threshold level) is applied to video decoder 107 from junction 178, video unscrambling occurs in complementary fashion to the video coding function in the transmitter in order that the input electrodes of picture tube 109 are supplied with a completely unscrambled video signal. Sweep systems 111 and 112 are, of course, operated in conventional manner from separator 110.

The intercarrier sound signal is applied to unit 114 from video amplifier 106 wherein it is amplified, amplitude limited and demodulated to a scrambled audio signal which takes essentially the same form as that produced in the output of audio coder 26 in the transmitter. Assuming that audio decoder 115 is provided with a control potential, also exceeding the threshold level, from junction 178, the scrambled audio signal is successfully unscrambled by virtue of the fact that the components are returned to their proper positions in the frequency spectrum, and thus the output of audio decoder 115 effectively constitutes a replica of the original uncoded sound signal. This replica is then amplified and reproduced in unit 117.

The $f_1$–$f_4$ code-signal bursts of the encoding signal are also manifest in the output of unit 114 and thus filter and rectifier units 121–124 facilitate their segregation or separation not only from the scrambled audio but also from each other. Every time a burst occurs, it is effectively picked out or selected by its assigned filter and rectifier unit and both positive and negative rectified envelopes of that burst are produced in the output circuits of the filter and rectifier. For example, each time a code burst of frequency $f_3$ occurs, that burst is manifest on the (+) output conductor of unit 123 as a positive pulse while at the same time it is produced on the (−) output conductor of filter and rectifier 123 as a negative polarity pulse.

Assuming that switching mechanism 126 is so adjusted that the connections or permutation pattern shown in dashed construction within block 126 in FIGURE 2 are established, each time a code burst of frequency $f_4$ occurs, the positive rectified envelope thereof is translated to input A, resulting in the rendering of triode 147 conductive. The ungrounded terminal of energy storage device or condenser 171 is thus effectively connected to source 154 through resistor 153 and condenser 171 therefore tends to charge in a positive direction or sense during the interval that tube 147 is conductive. The resistance of resistor 153 is preferably made sufficiently high that the time constant of the charging circuit for condenser 171 is relatively long compared to the time constant of its discharge path. While the discharge path is interrupted, several successive pulses on input A are required to raise the potential across condenser 171 substantially. For example, the circuit parameters may be so arranged that it requires at least a half dozen positive pulses on input A to charge energy storage device 171 in step-by-step fashion to a positive potential sufficient to establish junction 178 at the threshold level required to render decoders 107 and 115 operative. Clamping diode 176 is provided so that as soon as the potential at junction 178 reaches a value which exceeds the required threshold voltage level, it will be clamped thereto as the potential appearing at the junction of resistors 174 and 175 is arranged to be equal to that value.

Since the voltage on condenser 171 builds up in step-by-step manner, it and its charging circuit may be thought of as a counting circuit which executes a sequence of operating steps starting from a reference step. The discharge path for condenser 171 would then constitute a reset circuit for the counter.

Although triode or electronic switch 158 is normally cut-off due to the forced or fixed bias effected by source 166, the appearance of a positive pulse by itself on either inputs B or C will be effective to render that triode conductive. However, with switching mechanism 126 properly adjusted for the given program under consideration as shown by dashed construction lines within block 126 in FIGURE 2, when a positive pulse is applied to input B there will always be a concurrently applied negative pulse to input C, as discussed previously. In this way, one pulse will cancel out the other so that the net result is that triode 158 remains in its cut-off condition.

It will now be appreciated why switches 65 and 69 were adjusted as shown and additionally why gate circuit 42 was adjusted to be normally-closed in the transmitter of FIGURE 1. Before the commencement of each program, a particular adjustment for switching mechanism 126 and all of the corresponding switching mechanisms at the other subscriber receivers is selected, namely one of the 48 possible knob setting combinations is picked. No matter what that adjustment is, there will be positive pulses applied to inputs A and B while there are only negative pulses applied to input C due to the nature of mechanism 126. Once a determination is made as to which frequencies are channeled to inputs B and C, switches 65 and 69 and the appropriate one of gate circuits 41–44 are adjusted accordingly in order that when a burst is generated which is destined or earmarked for input B it will always be accompanied by a burst of a frequency earmarked for input C. In this way, for those subscribers who have subscribed to the program, and have thus been apprised of the correct setting for mechanism 126, any time a positive pulse is applied to input B simultaneously there will be applied a negative rectified envelope to input C so that the non-conductive condition of triode 158 is left unaltered.

Inputs B and C thus in a sense provide a pair of comparison signals having waveforms determined by the adjustment of the signal-translating elements and by the code pattern represented by the encoding signal. Tube 158 serves as a comparison device whose operating condition is determined by the instantaneous relative polarities of the comparison signals.

On the other hand, for the unauthorized subscribers who have not paid for or subscribed to the program under consideration and therefore do not have their switching mechanism 126 adjusted properly, positive pulses will appear on input B unaccompanied by a negative pulse on input C. This results in the rendering of electronic switch 158 conductive which in turn causes condenser 171 to discharge, if any charge has accumulated thereon. As mentioned before, resistors 169, 164 and triode 158 constitute a normally interrupted discharge path for storage device 171 and the resistance values are so selected that it exhibits a time constant small relative to that of the charging circuit for condenser 171.

Consequently, if an unauthorized subscriber bent on fraud attempts to find the correct combination for switching mechanism 126 by trial and error methods, any charge that may build up on condenser 171 will be rapidly removed by the completing of its discharge circuit effected by a positive pulse on input B without a concurrent negative pulse on input C. Since, as explained hereinbefore, the parameters of the charging circuit may be selected so that it requires at least a half dozen of positive pulses on input A to charge storage device 171 sufficiently to turn the decoders on, unless switching mechanism 126 is properly set, before those half dozen pulses are applied at least one positive pulse will probably be applied to input B to achieve discharging of condenser 171. By providing such a relatively long time interval in which to sufficiently charge storage device 171, whereas it is discharged substantially instantaneously, requires the passage of a significant amount of time on the part of the unauthorized subscriber before each new test of the knob settings is made. In other words, once the subscriber sets up knobs 137–140 to an adjustment picked by chance, he does not know for a rather considerable interval of time whether or not he has selected the right combination. Assume, for example, that the combination is almost right, in which case there may be an appearance of correct unscrambling for a while. This certainly cuts down on the number of trial and error adjustments that he can make. Of course, the required time to make each test adjustment may be increased by increasing the time spacing between code bursts.

It will be recalled that one of the conditions met by switching mechanism 126 is that the (—) conductor that is paired with the (+) conductor connected to input B is never connected to input C. Otherwise, an unauthorized subscriber would eventually discover the combination that would translate the opposite polarity envelopes for the same burst to inputs B and C and from then on, including succeeding programs, his receiver would achieve unscrambling as tube 158 would always be cut off.

In this connection, it should be realized that for illustrative purposes only and as a matter of convenience, mechanism 126 has been made rather simple. Of course, considerably more sophisticated switching arrangements may be employed in practicing the present invention.

The incorporation of use meter 180 is optional. When the potential at junction 178 is of sufficient magnitude, indicating that the subscriber is unscrambling a telecast, use meter 180 may be made to record or register that fact on a tape or other recording medium for charging apparatus.

By way of summary, the secrecy communication receiver of FIGURE 2 comprises means (amplifier, limiter and detector unit 114 and the circuitry coupled thereto) for deriving an encoding signal having a characteristic representing a given code pattern. Specifically, the encoding signal is made up of a series of code-signal bursts each of which has one of four different frequencies $f_1 f_4$. Since there is an interdependence between the bursts of two of the frequencies, namely the frequencies of the bursts that are applied to inputs B and C in the properly or correctly set decoding mechanism, the code-signal bursts effectively represent a given code pattern. Filter and rectifier units 121–124 and switching mechanism 126 constitute a decoding mechanism coupled to deriving means 114 and including a plurality of multi-position, signal-translating elements to be adjusted relative to one another in accordance with the code pattern. The rotary switches, which are signal-translating elements, in switching mechanism 126 are, of course, adjusted to a predetermined adjustment in accordance with the code pattern.

Source 154, resistor 153, triode 147 and input A constitute means including a charging circuit having a long time constant for establishing and maintaining a charge on energy storage device 171. Resistors 169 and 164 and normally-cutoff electronic switch 158 constitute a normally interrupted discharge path for storage device 171 having a time constant small relative to that of the charging circuit. Inputs B and C and resistors 159, 161 and 162, units 121–124 and mechanism 126 may be considered means including the decoding mechanism for utilizing at least a portion of the encoding signal to complete the discharge path during any operating interval in which there is an inexact correlation of the adjustment of the signal-translating elements relative to the code pattern.

Particularly, when mechanism 126 is not adjusted to the predetermined, required adjustment in accordance when the code pattern, code signal bursts of one of the frequencies are applied to triode 158 to turn it on and this discharges condenser 171. Inputs B and C may also be considered as means for deriving a pair of comparison signals having wave forms conjointly determined by the adjustment of the signal-translating elements within mechanism 126 and by the code pattern. Triode 158 is a comparison device to which the pair of comparison signals are applied to actuate the comparison device and complete the discharge path during any operating interval in which the signal-translating elements are improperly positioned.

Either one of decoders 107 and 115 may be considered a signal reproducer or controlled device having a plurality of operating conditions. The circuitry between condenser 171 and the decoders constitutes means responsive to the charge condition of the storage device for controlling the responsiveness of the reproducer or for establishing the controlled device in a predetermined one of its operating conditions.

Viewed from a different aspect, inputs B and C and triode 158 essentially constitute means for effectively comparing the adjustment of the decoding mechanism with the code pattern to derive a control effect representing the state of correlation therebetween. In other words, if the adjustment is correct and therefore properly correlated with the code pattern of the received encoding signal, any pulse developed on input B will be balanced out by an opposite polarity pulse on input C and thus triode 158 remains non-conductive. On the other hand, when the correlation is not correct, triode 158 conducts.

Considering the invention from a still different approach, inasmuch as condenser 171 requires at least a half dozen positive pulses on input A in order to establish junction 178 above the threshold voltage which is required to operate the decoders, condenser 171 and its charging circuit may be viewed as a counting circuit which, in response to applied pulses, executes a sequence of operating steps starting from a reference step. This obtains since the voltage on condenser 171 builds up in step-by-step fashion. A portion of the encoding signal, namely those bursts that are rectified and supplied to input A, effectively actuate the counting circuit through its sequence of steps during any operating interval in which the adjustment of mechanism 126 is correctly correlated with the code pattern of the encoding signal. The discharge circuit for condenser 171 constitutes a reset circuit and is actuated by a portion of the encoding signal to reset the counting circuit to the reference step during any operating interval in which there is an inexact correlation between the adjustmnet of the signal-translating elements in mechanism 126 and the code pattern of the encoding signal. In other words, the counting circuit is reset by discharging the condenser. Decoders 107 and 115 are rendered operative responsive to the execution of the counting circuit through its sequence of steps.

While particular embodiments of the invention have been shown and described, modifications may be made, and it is intended in the appended claims to cover all such modifications as may fall within the true spirit and scope of the invention.

I claim:

1. A secrecy communication receiver comprising: means for deriving an encoding signal having a characteristic representing a given code pattern; a decoding mechanism coupled to said deriving means and including a plurality of multi-position, signal translating elements to be adjusted relative to one another in accordance with said code pattern; an energy storage device; means including a charging circuit for establishing and maintaining a charge on said storage device; a normally interrupted discharge path for said storage device; means including said decoding mechanism for utilizing at least a portion of said encoding signal to complete said discharge path during any operating interval in which there is an inexact correlation of the adjustment of said signal-translating elements relative to said code pattern; a signal reproducer; and means responsive to the charge condition of said storage device for controlling the responsiveness of said reproducer.

2. A secrecy communication receiver comprising: means for deriving an encoding signal having a characteristic representing a given code pattern; a decoding mechanism coupled to said deriving means and including a plurality of multi-position, signal-translating elements to be adjusted relative to one another in accordance with said code pattern; a condenser; means including a charging circuit having a long time constant for establishing and maintaining a charge on said condenser; a normally interrupted discharge path for said condenser having a time constant small relative to that of said charging circuit; means including said decoding mechanism for utilizing at least a portion of said encoding signal to complete said discharge path during any operating interval in which there is an inexact correlation of the adjustment of said signal-translating elements relative to said code pattern; a signal reproducer; and means responsive to the charge condition of said condenser for controlling the responsiveness of said reproducer.

3. A secrecy communication receiver comprising: means for deriving an encoding signal having a characteristic representing a given code pattern; a decoding mechanism coupled to said deriving means and including a plurality of multi-position, signal translating elements to be adjusted relative to one another to a predetermined adjustment in accordance with said code pattern; an energy storage device; means including a charging circuit having a long time constant for establishing and maintaining a charge on said storage device; a normally interrupted discharge path for said storage device having a time constant small relative to that of said charging circuit; means including said decoding mechanism for utilizing at least a portion of said encoding signal to complete said discharge path during any operating interval in which said signal translating elements are positioned to an adjustment other than said predetermined adjustment; a signal reproducer; and means responsive to the charge condition of said storage device for controlling the responsiveness of said reproducer.

4. A secrecy communication receiver comprising: means for deriving an encoding signal having a characteristic representing a given code pattern; a decoding mechanism coupled to said deriving means and including a plurality of multi-position, signal-translating elements to be adjusted relative to one another in accordance with said code pattern; an energy storage device; means including a charging circuit having a long time constant for establishing and maintaining a charge on said storage device; a normally interrupted discharge path for said storage device having a time constant small relative to that of said charging circuit; means including said decoding mechanism for utilizing at least a portion of said encoding signal to complete said discharge path during any operating interval in which there is an inexact correlation of the adjustment of said signal-translating elements relative to said code pattern; a controlled device having a plurality of operating conditions; and means responsive to the charge condition of said storage device for establishing said controlled device in a predetermined one of its operating conditions.

5. A secrecy communication receiver comprising: means for deriving an encoding signal having a characteristic representing a given code pattern; a decoding mechanism coupled to said deriving means and including a plurality of adjustable code-determining elements to be adjusted relative to one another in accordance with said code pattern; means for effectively comparing the adjustment of said decoding mechanism with said code pattern to derive a control effect representing the state of correlation therebetween; an energy storage device; means including a charging circuit having a long time constant for establishing and maintaining a charge on said storage device; a normally interrupted discharge path for said storage device having a time constant small relative to that of said charging circuit; means for utilizing said control effect to complete said discharge path during any operating interval in which there is an inexact correlation of the adjustment of said decoding mechanism relative to said code pattern; a signal reproducer; and means responsive to the charge condition of said storage device for controlling the responsiveness of said reproducer.

6. A secrecy communication receiver comprising: means for deriving an encoding signal having a characteristic representing a given code pattern; a decoding mechanism coupled to said deriving means and including a plurality of multi-position, signal-translating elements to be adjusted relative to one another in accordance with said code pattern; means for deriving a pair of comparison signals having waveforms determined by the adjustment of said signal-translating elements and by said code pattern; an energy storage device; means including a charging circuit having a long time constant for establishing and maintaining a charge on said storage device; a normally interrupted discharge path for said storage device having a time constant small relative to that of said charging circuit; a comparison device for completing said discharge path; means for applying said pair of comparison signals to said comparison device to actuate said comparison device and complete said discharge path during any operating interval in which the instantaneous relative polarities of said pair of signals represents an inexact correlation of the adjustment of said signal-translating elements relative to said code pattern; a signal reproducer; and means responsive to the charge condition of said storage device for controlling the responsiveness of said reproducer.

7. A secrecy communication receiver for utilizing a scrambled intelligence signal and an encoding signal including correlation components representing a given code pattern, said receiver comprising: a decoding mechanism including a plurality of multi-position, signal-translating elements to be adjusted relative to one another in accordance with said code pattern; means for applying said correlation components to said decoding mechanism; an energy storage device; means including a charging circuit having a long time constant for establishing and maintaining a charge on said storage device; a normally interrupted discharge path for said storage device having a time constant small relative to that of said charging circuit; means including said decoding mechanism for effectively comparing said correlation components with the adjustment of said signal-translating elements to complete said discharge path during any operating interval in which there is an inexact correlation of the adjustment of said signal-translating elements relative to said code pattern; a signal reproducer; and means responsive to the charge condition of said storage device for controlling the responsiveness of said reproducer.

8. A secrecy communication receiver comprising: means for deriving an encoding signal having a characteristic representing a given code pattern; a decoding mechanism coupled to said deriving means and including a plurality of multi-position, signal-translating elements to be adjusted relative to one another in accordance with said code pattern; an energy storage device; means including a charging circuit having a long time constant for establishing and maintaining a charge on said storage device; a normally interrupted discharge path for said storage device having a time constant small relative to that of said charging circuit; means including said decoding mechanism for utilizing at least a portion of said encoding signal to complete said discharge path during any operating interval in which there is an inexact correlation of the adjustment of said signal-translating elements relative to said code pattern; a use meter; and means responsive to the charge condition of said storage device for actuating said use meter.

9. A secrecy communication receiver comprising: means for deriving an encoding signal having a characteristic representing a given code pattern; a decoding mechanism coupled to said deriving means and including a plurality of multi-position, signal-translating elements to be adjusted relative to one another in accordance with said code pattern; an energy storage device; means including a charging circuit having a long time constant for establishing and maintaining a charge on said storage device; a normally interrupted discharge path for said storage device having a time constant small relative to that of said charging circuit and including a normally non-conductive electronic switch; means including said decoding mechanism for utilizing at least a portion of said encoding signal to render said electronic switch conductive to complete said discharge path during any operating interval in which there is an inexact correlation of the adjustment of said signal-translating elements relative to said code pattern; a signal reproducer; and means responsive to the charge condition of said storage device for controlling the responsiveness of said reproducer.

10. A secrecy communication receiver comprising: means for deriving an encoding signal having a characteristic representing a given code pattern; a decoding mechanism coupled to said deriving means and including a plurality of multi-position, signal-translating elements to be adjusted relative to one another in accordance with said code pattern; an energy storage device; means including a charging circuit having a long time constant and said decoding mechanism for utilizing at least a portion of said encoding signal to establish and to maintain a charge on said storage device during any operating interval in which there is an exact correlation of the adjustment of said signal-translating elements relative to said code pattern; a normally interrupted discharge path for said storage device having a time constant small relative to that of said charging circuit; means including said decoding mechanism for utilizing at least a portion of said encoding signal to complete said discharge path during any operating interval in which there is an inexact correlation of the adjustment of said signal-translating elements relative to said code pattern; a signal reproducer; and means responsive to the charge condition of said storage device for controlling the responsiveness of said reproducer.

11. A secrecy communication receiver comprising: means for deriving an encoding signal having a characteristic representing a given code pattern; a decoding mechanism coupled to said deriving means and including a plurality of multi-position, signal-translating elements to be adjusted relative to one another in accordance with said code pattern; an energy storage device; a charging circuit for said storage device having a long time constant and including a source of unidirectional potential and a normally non-conductive electronic switch; means including said decoding mechanism for utilizing at least a portion of said encoding signal to render said electronic switch conductive to establish a charge on said storage device during operating intervals in which there is an exact correlation of the adjustment of said signal-translating elements relative to said code pattern; a normally interrupted discharge path for said storage device having a time constant small relative to that of said charging circuit; means including said decoding mechanism for utilizing at least a portion of said encoding signal to complete said discharge path during any operating interval in which there is an inexact correlation of the adjustment of said signal-translating elements relative to said code pattern; a signal reproducer; and means responsive to the charge condition of said storage device for controlling the responsiveness of said reproducer.

12. A subscription television receiver for utilizing a scrambled television signal including video components and audio components, said receiver comprising: means for deriving an encoding signal having a characteristic representing a given code pattern; a decoding mechanism coupled to said deriving means and including a plurality of multi-position, signal-translating elements to be adjusted relative to one another in accordance with said code pattern; an energy storage device; means including a charging circuit having a long time constant for establishing and maintaining a charge on said storage device; a normally interrupted discharge path for said storage device having a time constant small relative to that of said charging circuit; means including said decoding mechanism for utilizing at least a portion of said encoding signal to complete said discharge path during any operating interval in which there is an inexact correlation of the adjustment of said signal-translating elements relative to said code pattern; an unscrambling device for unscrambling at least some of said components included in said television signal; and means responsive to the charge condition of said storage device for controlling the operation of said unscrambling device.

13. A secrecy communication receiver comprising: means for deriving an encoding signal having a characteristic representing a given code pattern; a decoding mechanism coupled to said deriving means and including a plurality of multi-position, signal-translating elements to be adjusted relative to one another in accordance with said code pattern; a counting circuit, responsive to an applied signal, executing a sequence of operating steps starting from a reference step; means including said decoding mechanism for utilizing at least a portion of said encoding signal to actuate said counting circuit through said sequence of steps during any operating interval in which there is an exact correlation of the adjustment of said signal-translating elements relative to said code pattern; means including said decoding mechanism for utilizing at least a portion of said encoding signal to reset said counting circuit to said reference step during any operating interval in which there is an inexact correlation of the adjustment of said signal-translating elements relative to said code pattern; a signal reproducer; and means coupled to said counting circuit and said signal reproducer for rendering said reproducer operative responsive to the execution of said counting circuit through its sequence of steps.

*14. A secrecy communication receiver for utilizing a received intelligence signal comprising: an adjustable code-determining apparatus to be established in a predetermined condition of adjustment to effect utilization of said intelligence signal; testing means for performing several successive and similar correlation tests to determine*

*if said code-determining apparatus has in fact been properly positioned to said predetermined condition of adjustment; and means coupled to said testing means and responsive only to a positive result in all of said successive correlation tests for subsequently producing a control effect indicating a correct correlation status of said code-determining apparatus.*

*15. A secrecy communication receiver comprising: a decoding mechanism including a plurality of adjustable code-determining elements to be adjusted in accordance with a given code pattern; testing means for performing several successive and similar correlation tests to determine, at the instant of each test, if said code-determining elements have in fact been properly positioned in accordance with said given code pattern; and means coupled to said testing means and responsive only to a positive result in all of a predetermined number of said correlation tests for subsequently producing a control effect indicating a correct correlation status of said code-determining elements.*

*16. A secrecy communication receiver for utilizing a received intelligence signal comprising: an adjustable code-determining apparatus to be established in a predetermined condition of adjustment to effect utilization of said intelligence signal; testing means for performing several successive and similar correlation tests to determine if said code-determining apparatus has in fact been properly positioned to said predetermined condition of adjustment; time-delay means coupled to said testing means and responsive only to the success of all of said successive correlation tests for progressing from a starting condition to a final condition; and means for returning said time-delay means to its starting condition in response to the failure of any one of said correlation tests.*

References Cited in the file of this patent or the original patent

UNITED STATES PATENTS

| | | |
|---|---|---|
| 3,001,011 | Weiss | Sept. 19, 1961 |
| 3,021,383 | Mountjoy | Feb. 13, 1962 |